June 9, 1964   R. R. GUNDERSON   3,136,512
FOLDABLE SUPPORT FOR WARNING SIGNAL
Filed Feb. 28, 1961   2 Sheets-Sheet 1
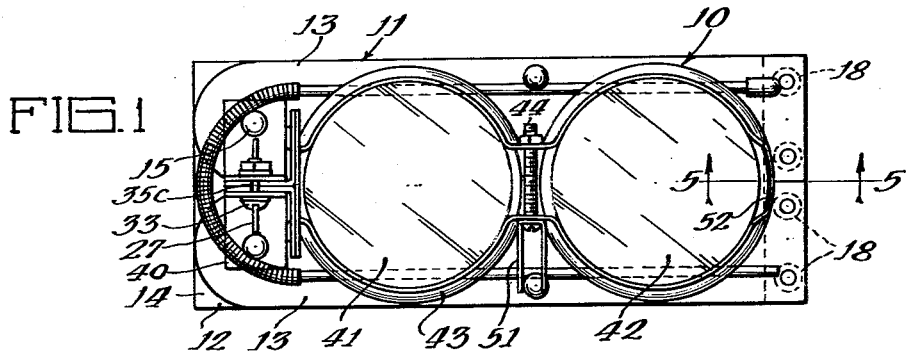
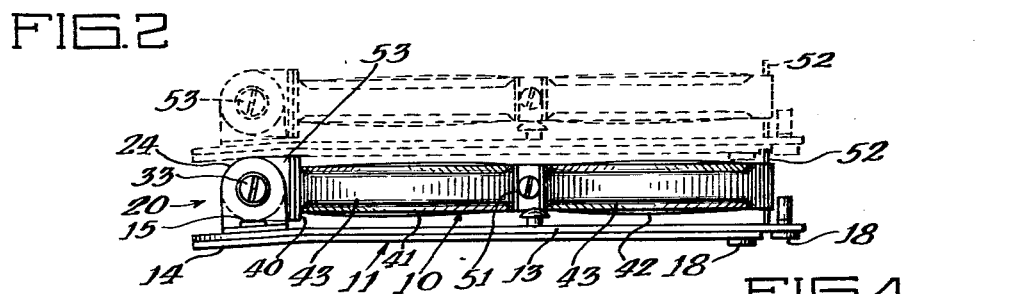
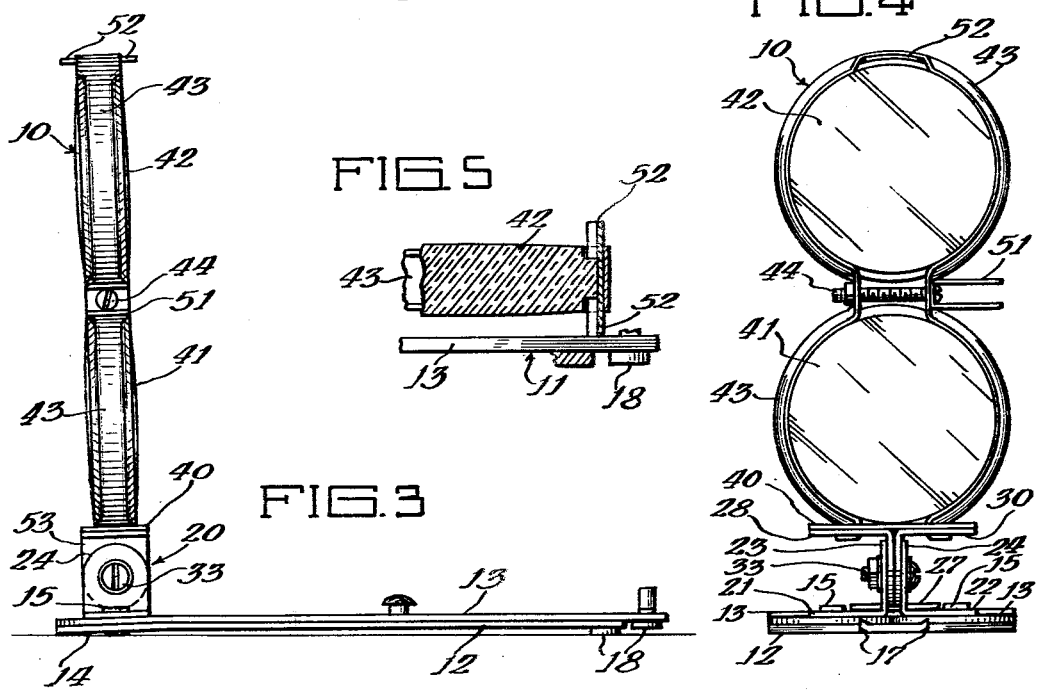
Inventor:
Ralph R. Gunderson
By: Hofgren, Brady, Wegner,
Allen & Stellman
Attorneys June 9, 1964 R. R. GUNDERSON 3,136,512
FOLDABLE SUPPORT FOR WARNING SIGNAL
Filed Feb. 28, 1961 2 Sheets-Sheet 2
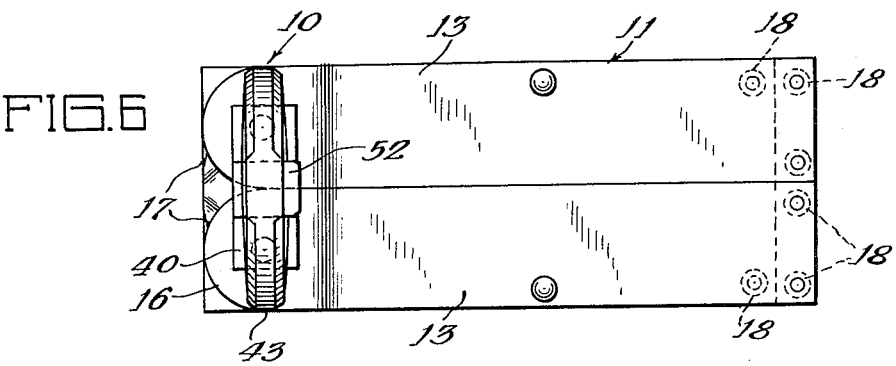
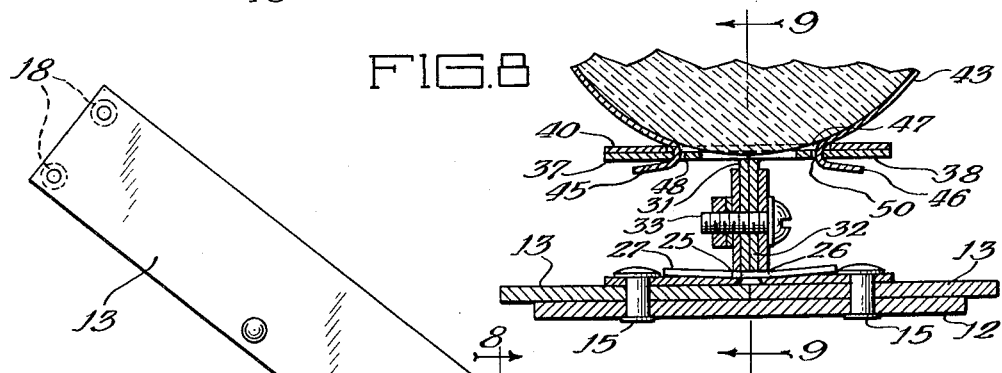
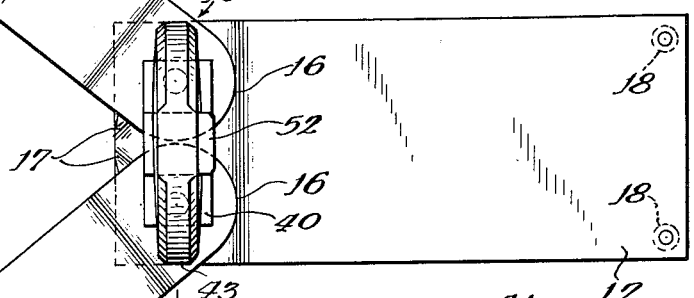
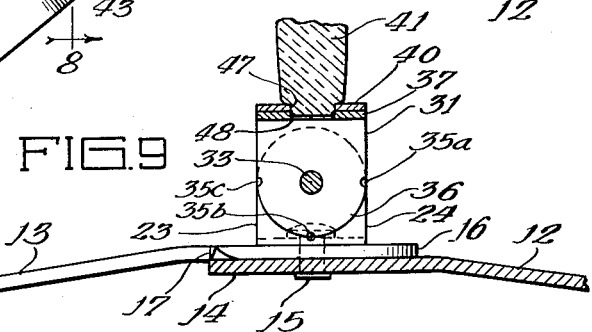
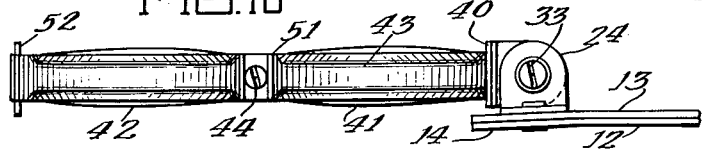

United States Patent Office 3,136,512
Patented June 9, 1964

3,136,512
FOLDABLE SUPPORT FOR WARNING SIGNAL
Ralph R. Gunderson, 5520 South Shore Drive,
Chicago, Ill.
Filed Feb. 28, 1961, Ser. No. 92,259
8 Claims. (Cl. 248—33)

This invention relates to a foldable warning signal of the type commonly used on the highway to warn approaching traffic of the existence of an obstruction or other emergency condition.

Foldable warning signals are commonly carried by private vehicular and commercial truck traffic. The nature of their use requires compactness when stored, stability when being used, and ease of placing in upright operative position. The warning signal structure of the present invention employs a new and unique co-action between a supporting base assembly and latch means which retains the warning signal in signaling position during use. The invention provides for greater stability and adaptability enabling the structure to be used under more varied conditions, both of weather and locale. The simple, but novel, construction realizes savings in manufacturing costs while at the same time enabling use of heavier gauge and more durable material.

The primary object of this invention is to provide a new and improved foldable warning signal.

Another object is to provide a foldable warning signal of increased stability which is capable of being stacked with similar devices for storage without damage to the reflecting lenses.

A further object is to provide a warning signal affording a unique co-action between the supporting base and latch means to facilitate movement of the device from stored to upright operative position.

Another object is to provide a warning signal having a supporting base affording multiple positions of support for varying conditions of use.

The invention is illustrated in the preferred embodiment of the accompanying drawings, in which:

FIG. 1 is a top plan view of a warning signal with the signal device and the support legs in retracted closed position, and showing a flexible flagstaff in storage position on the supporting base;

FIG. 2 is a side elevational view of the device of FIG. 1 showing a second warning signal in dotted outline stacked thereon and spaced from the reflecting lenses of the first device;

FIG. 3 is a side elevational view of the warning signal with the signal device in an upright latched position and the supporting legs in closed or retracted position;

FIG. 4 is a front elevational view of the warning signal taken from the left of FIG. 3;

FIG. 5 is a fragmentary enlarged sectional view taken as indicated at line 5—5 of FIG. 1;

FIG. 6 is a top plan view of the warning signal of FIG. 3;

FIG. 7 is a top plan view of the warning signal similar to FIG. 3 but showing the supporting legs in open supporting position;

FIG. 8 is a fragmentary enlarged sectional view taken as indicated on line 8—8 of FIG. 7;

FIG. 9 is a fragmentary sectional view taken as indicated on line 9—9 of FIG. 8; and FIG. 10 is a fragmentary side elevational view of the warning signal showing the warning signal frame swung to forward extended position.

In the embodiment illustrated, a warning signal frame or signaling device, generally designated 10, is swingably mounted on a supporting base or base assembly, generally designated 11, for movement between a closed reclining position (FIGS. 1 and 2) and a latched upright position (FIG. 3).

As best seen in FIG. 7, the supporting base 11 includes an elongated base plate or first supporting leg 12 and a pair of secondary supporting legs 13 each pivotally secured to the front end portion 14 of supporting leg 12 by rivets or pivot pins 15. The pivoted end of each of the secondary supporting legs 13 is preferably formed on a radius, as at 16, to provide clearance for the legs 13 as they are pivoted between retracted closed position (FIG. 6) and open supporting position (FIG. 7).

The front end portion 14 of the first supporting leg 12 may be bent slightly downwardly at an acute angle to the plane of leg 12 and each of the secondary legs 13 is similarly bent through approximately the same angle so that they lie closely adjacent the upper surface of the leg 12 when in retracted position. As seen in FIG. 9, the acute angle formed in each of the supporting legs enhances the stability of the signaling device 10 when it is supported on an uneven surface by spacing the central portion of the device from the supporting surface.

A pair of upright stop members 17 is preferably struck upwardly from the front end portion 14 of supporting leg 12, each stop member being positioned to limit or arrest the movement of one of the supporting legs 13 in the optimum supporting position. As best seen in FIGS. 3 and 6, the supporting ends of each of the supporting legs may be perforated to receive a rubber element 18 each of which rests on the supporting surface when the legs are in open operative position. Preferably, secondary supporting legs 13 may be of a length to overlap the first supporting leg 12 when in the closed retracted position, as seen in FIG. 1, so that the rubber elements 18 will not interfere with the compactness of the supporting base 11 when thus folded.

As best seen in FIG. 3, the signaling device 10 is preferably swingably mounted upon the forward end portion 14 of the supporting base 11 by a hinged structure, generally designated 20. The hinged structure 20 preferably includes a pair of L-shaped brackets 21 and 22 spaced laterally of the front end portion 14 and positioned so that each of their upright legs 23 and 24 is in juxtaposition with the other leg. Each of the brackets 21 and 22 is secured in position by one of the rivets 15 upon which the supporting legs 13 are pivoted. Each of the upright legs 23 and 24 adjacent its lower end is preferably provided with apertures 25—26. The apertures 25—26 are laterally aligned and are of a size to snugly receive a first latch member, herein shown as a strip of spring wire 27, which affords a part of a latching mechanism for the signaling device.

Another portion of the hinged structure 20 is preferably formed from L-shaped hinge portions 28 and 30 which have depending leg portions 31—32 abutting each other and positioned between the upright legs 23—24. The legs 23—24 and the depending leg portions 31—32 each have centrally aligned apertures of a size to receive a bolt 33 and its nut which afford a pivot about which the signaling device 10 may be swung.

As best seen in FIG. 9, the lower ends of the depending leg portions 31 and 32 are preferably each similarly rounded on a radius, and are each provided with second latching members, herein shown as a number of recesses located to afford a plurality of transversely extending latching grooves 35a, 35b and 35c.

Referring again to FIGS. 8 and 9, the depending leg portions 31 and 32 are positioned in relation to the spring wire latch portion 27 so that the intermediate peripheral edge 36 between the latching grooves 35a, b and c normally contacts and depresses the spring wire 27 in its medial portion between the upright legs 23 and 24 of the L-shaped brackets. Thus, when the hinged portions 28 and 30 are swung to upright position, as shown in FIG. 9, the latching groove 35b is brought into alignment with the resilient spring wire 27 so that the spring-loaded wire 27 snaps upwardly into latching position in the latching grooves. Similarly, the spring wire 27 may be brought into latching engagement with latching grooves 35a or 35c by swinging the hinged portions 28 and 30 through the proper angle to latch the signaling device in retracted position (FIG. 2) or forward extended position (FIG. 10), respectively.

As best shown in FIGS. 4 and 8, the hinged portions 28 and 30 each have an outwardly extending leg portion 37—38 which together with a superposed plate 40 affords a mounting surface for the frame and lenses of the signaling device 10. To this end, a lower pair of lenses 41 and an upper pair of lenses 42 are each arranged with reflecting surfaces facing outwardly and are held in spaced relation by a bezel 43 forming the frame of the signaling device.

The bezel 43 clampingly embraces a major portion of the peripheral marginal edge portion of each of the pairs of reflecting lenses and is provided in its central portion with a nut and bolt 44 which passes through perforate portions of the bezel 43 so that the bezel is snugly retained about the pairs of lenses. The lower free ends 45 and 46 of the bezel 43 preferably are passed transversely through an opening 47 in the mounting plate 40 and through slots 48 and 50 in the leg portions 37 and 38, and then are bent or crimped outwardly beneath these leg portions to securely anchor the lens structure. If desired, a U-shaped perforate bracket 51 may be provided to accommodate the staff of a warning flag.

As best shown in FIG. 2, a spacer member 52 may be inserted between the bezel 43 and the upper end of the lens structure 42 so as to extend transversely outwardly a short distance beyond the exposed lens surfaces of each of the pairs of lenses 41 and 42. Thus, the spacer member 52 will bear against the upper surface of the supporting base 11 when the signaling device is in reclining position. If it is desired to stack a second warning signal on the first warning signal, as shown in FIG. 2, the other end of the spacer member 52 will abut the lower surface of the first supporting leg 12 of that device to space and protect the upper lens faces from that leg. At the forward end of the warning signal, the L-shaped hinged portions 28 and 30 have marginal side portions as shown at 53 which space that end of the warning signal and its exposed lens surfaces from the base of a superposed warning signal. Thus, it is obvious that the structure of the present warning signal is arranged so that several of the devices may be stored in a convenient package or container when not in use with ample protection afforded to the exposed reflecting lens faces.

It should be noted that the co-action of the latching means of the present invention provides positive latching of the signaling device 10 in its closed or storage position (FIG. 2), in its upright or operative position (FIG. 3), and in its forward extended position (FIG. 10). When in extended position, that is, when the signaling device 10 is swung through 180° from reclining position, the supporting legs may be retained in closed position and the supporting base 11 may be impaled in mud, snow or the like to support the signaling device 10 in an upright operative position.

The foregoing detailed description is given for clearness of understanding only, and no unnecessary limitations should be understood therefrom, for some modifications will be obvious to those skilled in the art.

I claim:

1. A foldable support for a warning signal, comprising: a supporting base; a warning signal frame secured to said supporting base for movement from reclining position over said base to an extended operative position forwardly of said base; and cooperating latching means operable between one end of the warning signal frame and the front end portion of the supporting base to latch said warning signal frame in forward extended position.

2. A foldable support for a warning signal, comprising: a supporting base assembly having a plurality of legs swingable relative to each other from a retracted position to a forward supporting position, said legs being juxtaposed when in retracted position; a warning signal frame hingedly secured at one end to the front end portion of said supporting base assembly for swingable movement through substantially 180° from a reclining position over said base assembly to a forward extended position; and cooperating latching means operable between said one end of the warning signal frame and the front end portion of the supporting base assembly to latch said warning signal frame in forward extended position.

3. A foldable support for a warning signal, comprising: a supporting base assembly having a plurality of legs swingable relative to each other from a retracted position to a forward supporting position, said legs being juxtaposed when in retracted position; a warning signal frame hingedly secured at one end to the front end portion of said supporting base assembly for swingable movement through substantially 180° from a reclining position over said base assembly to a forward extended position; and cooperating latching means operable between said hinged end of the warning signal frame and said front end portion of the supporting base assembly for latching said warning signal frame in extended and in reclining position.

4. A foldable support for a warning signal, comprising: a supporting base assembly having a plurality of legs swingable relative to each other from a retracted position to a forward supporting position, said legs being juxtaposed when in retracted position; a warning signal frame hingedly secured at one end to the front end portion of said supporting base assembly for swingable movement through substantially 180° from a reclining position over said base assembly to a forward extended position; and latching means including a first latch member on the hinged end of the warning signal frame and a cooperating second latch member for holding said warning signal frame in forward extended position, one of said latching members being spring-loaded to effect latching engagement when said warning signal frame is swung to forward extended position.

5. A foldable support for a warning signal, comprising: a supporting base assembly having a first supporting leg and a pair of secondary supporting legs pivoted to said first supporting leg and juxtaposed with said first leg when in retracted position, said secondary legs being swingable forwardly to a laterally spaced supporting position; a warning signal frame hingedly secured at one end to the front end portion of said supporting base assembly for swingable movement through substantially 180° from a reclining position adjacent said base through an upright signaling position to a forward extended position; and cooperating latching means operable between said hinged end of the warning signal frame and the front end portion of the supporting base assembly for latching said signal frame in each of said three positions.

6. A foldable warning signal as specified in claim 5 in which the hinged end of said frame is generally rounded and the latching means includes a laterally extending elongated spring positioned on the front end portion of the supporting base and three cooperating lateral grooves formed substantially 90° apart in the peripheral edge of said hinged end, the grooves each being of a size to receive the medial portion of said spring for latching the signal frame in each of the three positions, the medial portion abutting said peripheral edge of the hinged end and being yieldably forced downwardly by said peripheral edge to unlatch the frame when said frame is swung from one of said positions to another.

7. A foldable support for a warning signal, comprising: a supporting base assembly having a plurality of legs swingable relative to each other from a retracted position to a forward supporting position, said legs being juxtaposed when in retracted position; a warning signal frame hingedly secured at one end to the front end portion of said supporting base assembly to afford swinging movement between a reclining position over said supporting base assembly and an upright signaling position; and cooperating latching means operable between said one end of the warning signal frame and the front end portion of the supporting base assembly, the latching means including a laterally extending elongated spring member and a second member affording a latching groove, one of said members being on the warning signal frame and the other of said members being on the supporting base assembly, the spring member being engageable in the latching groove to retain said signal frame in upright supporting position on its supporting base assembly.

8. A foldable support for a warning signal, comprising: a supporting base assembly having a first supporting leg and a pair of secondary supporting legs pivoted to said first supporting leg and juxtaposed with said first leg when in retracted position, said secondary legs being swingable forwardly to a laterally spaced supporting position; a warning signal frame hingedly secured at one end to the front end portion of said supporting base assembly for swinging movement from upright signaling position to reclining position over said supporting base assembly; and cooperating latching means operable between said one end of the warning signal frame and the front end portion of the supporting base assembly to retain said signal frame in upright position on the three supporting legs, said latching means including a laterally extending elongated spring positioned on the front end portion of the supporting base assembly and a cooperating lateral groove formed in the hinged end of the warning signal frame and positioned to receive said spring in latching engagement when the signal frame is in upright position, said spring bearing against said hinged end and being yieldable downwardly when the frame is swung toward reclining position to effect unlatching of the signal frame.

References Cited in the file of this patent

UNITED STATES PATENTS

| | | |
|---|---|---|
| 1,262,712 | Stone | Apr. 16, 1918 |
| 2,410,171 | LeLande | Oct. 29, 1946 |
| 2,436,298 | Gunderson | Feb. 17, 1948 |
| 2,464,031 | Fiedel | Mar. 8, 1949 |
| 2,679,370 | Bolser | May 25, 1954 |
| 2,704,974 | Setman | Mar. 29, 1955 |
| 2,735,637 | Tolbert | Feb. 21, 1956 |